United States Patent [19]

Davé

[11] 4,140,818

[45] Feb. 20, 1979

[54] FREELY STRIPPABLE ELECTRICAL CABLE INSULATION COMPOSITION AND METHOD

[75] Inventor: Bharat Davé, Natick, Mass.

[73] Assignee: United States Steel Corporation, Pittsburgh, Pa.

[21] Appl. No.: 834,075

[22] Filed: Sep. 19, 1977

[51] Int. Cl.$^2$ .............................................. H01B 3/30
[52] U.S. Cl. ............................ 427/117; 174/110 SR; 174/110 PM; 252/63.2; 252/63.5; 252/63.7; 526/4; 526/6
[58] Field of Search ................... 252/63.2, 63.5, 63.7; 174/110 SR, 110 PM, 110 R; 427/117; 428/379; 526/4, 6; 260/45.75 T, 45.8 NT, 45.9 NC

[56] References Cited

U.S. PATENT DOCUMENTS

| | | | |
|---|---|---|---|
| 3,909,507 | 9/1975 | Betts et al. ....................... | 427/118 X |
| 3,962,517 | 6/1976 | Verne ............................... | 427/118 X |
| 3,997,551 | 12/1976 | Minagawa et al. .............. | 260/308 R |
| 4,044,200 | 8/1977 | Turbett ..................... | 174/110 PM X |

*Primary Examiner*—Harris A. Pitlick
*Attorney, Agent, or Firm*—William L. Krayer

[57] ABSTRACT

Cured insulation compositions are rendered freely strippable from the encased conductors through the use of small amounts of (a) a dialkyl tin diester, (b) N,N'-ethylene bis-stearamide or similar waxy composition, and (c) certain 3-amido-1,2,4-triazoles.

9 Claims, No Drawings

FREELY STRIPPABLE ELECTRICAL CABLE INSULATION COMPOSITION AND METHOD

BACKGROUND OF THE INVENTION

It is common in the art of making electrical cables and insulated conducting wires to encase the cables or conductors in polymeric insulation material which may be placed around the conductors in semi-liquid (melt) form and heated to vulcanize or cross-link the polymer composition while it is extruded through a die, holding the conductor in the desired position in the die. Or, the polymeric material may be held in a stationary mold for vulcanizing or cross-linking (curing) under the influence of heat and pressure when splicing is performed in place.

The thermosetting materials commonly used for these purposes are well-known to the art, and have been published many times. See, for example, the recipes in Exxon Chemical Co. published product literature "Materials for the Electrical Industry".

However, particularly in the case of cables which must frequently be terminated and/or spliced in place, such as lengthy power cables for minimg machinery, which are frequently broken or severed by the machinery itself, a difficult problem is presented when the insulation is so adherent to the conductor or so deeply impregnated in the interstices of the strands of the cable that it is extremely difficult to expose a clean conductor surface for termination or connecting with another conductor or portion of the same one. To overcome this problem in the past the industry has employed tin-coated conductors, which are known to be readily strippable, but which add a significant expense far out of proportion to the small areas where splicing or termination is performed. A relatively inexpensive freely strippable thermosetting insulation material is difficult to come by in the art.

SUMMARY OF THE INVENTION

I have found that there are three ingredients which may be used in conventional thermosetting insulation recipes to render the insulation freely strippable. My composition is particularly useful where bare annealed copper is used as a conductor. The ingredients are (A) a dialkyl tin diester, (B) a waxy amide, and (C) a 3-amido-1,2,4-triazole of the type described and claimed in U.S. Pat. No. 3,997,551 to Minagawa et al. The three ingredients should be used in weight ratios of about 1:10:10, but each ingredient may be varied plus or minus fifty percent; thus, the ratios I may use include 0.5:5:20, 1:10:5, etc., or, generally 0.5–2:5–20:5–20, in parts by weight.

The conventional curable insulating compositions with which my three ingredients may be used include any resinous compositions based on vulcanizable olefin polymers such as ethylene and propylene polymers, copolymers or terpolymers. Typical compositions include those disclosed in U.S. Pat. Nos. 3,962,517; 3,909,507; 3,990,479 and 3,965,216.

More particularly, my three-membered composition for rendering thermosetting insulation strippable includes any of the curable or cross-linked polyethylene or ethylene-propylene based compositions in common use, such as those disclosed in the abovementioned patents and U.S. Pat. No. 3,684,821, the disclosures of which are incorporated by reference. As in the last mentioned patent, my composition and process are applicable to insulations including cross-linked polyethylene or cross-linked polyethylene or ethylene-propylene co- or terpolymer as the chief constituent.

Following is a preferred composition with which my invention is particularly helpful.

TABLE I

| | Ingredients | Parts by Weight |
|---|---|---|
| 1. | Ethylene-Propylene Terpolymer (Vistalon 2504, Exxon Chemical Co.) | 80–100 |
| 2. | Low Density Polyethylene (LD-600, Exxon Chemical Co.) | 0–20 |
| 3. | Anti-Oxidant (Flectol H, Monsanto or Agerite MA Vanderbilt) | 2–3 |
| 4. | Zinc Oxide, (Protox 167, New Jersey Zinc) | 5–7 |
| 5. | Calcined Clay (Iceberg or Icecap K Burgess Pigment Co.) | 85–110 |
| 6. | Paraffinic Oil (Sunpar 2280, Sun Oil Co.) | 20–25 |
| 7. | Vinyl Silane (A-172, Union Carbide) | 1–2 |
| 8. | Dicumyl Peroxide (Dicup 40KE, Hercules, Inc.) | 7–10 |
| 9. | a, a'-bis (t-butyl peroxy) diisopropylbenzene (Vulcup 40KE, Hercules, Inc.) | 3–5 |
| 10. | Triallyl cyanurate (TAC-75, Kenrich) | 0.2–0.5 |

As is known in the art, the above ingredients 1 thru 10 can be compounded and mixed in an internal intensive mixer, e.g. Banbury Mixer. This can be done in either one step or two steps.

In one step mixing, all the ingredients including cross-linking agents 8, 9 and 10 are mixed in one mixing cycle.

In two step mixing however, ingredients 1 thru 7 are mixed in first step in an internal intensive mixer. In second step the cross-linking agents 8, 9 and 10 are mixed with the socalled "master batch" (mixed in first step) in an internal intensive mixer.

According to the preferred method of my invention, the three ingredients of my invention may be added either in one or two steps mixing along with the cross-linking agents 8, 9 and 10.

Following is a discussion of the significant variations in each of the above ingredients which may be helpful in my invention.

1. The ratio of ethylene to propylene in this terpolymer may be varied from about 20:80 to about 80:20. The termonomer may be any of the common monomers capable of supplying a pendant unsaturated group, such as ethyldiene norbornene or 1,4-hexadiene. It may be present in concentrations up to about 10%.

2. The low density polyethylene is not an essential ingredient; however, when it is used it could be used in amounts up to about 25 parts by weight, in order to obtain desired mechanical strength.

3. This antioxidant compound is used to inhibit oxidative deterioration of the insulating composition; may be employed in amounts up to about 3%.

4. The zinc oxide is used for heat stabilization and could be used up to 7 parts by weight.

5. A filler is a very common ingredient; it could be used in amounts up to about 110 parts by weight.

6. The paraffinic oil is used as a plasticizer in amounts up to about 30 parts by weight.

7. The preferred "vinyl silane" is employed as a binder for the polymer and clay.

8,9,10 These compositions are conventional vulcanizing or cross-linking compositions which may be employed in various combinations, amounts, and compositions, as is known in the art. I intend to include within my invention any polyolefinic crosslinkable or vulcanizable composition. It includes a composition comprising a major amount of olefin polymer, a small amount of vulcanizing agent, and a small amount of the waxy amide, dialkyl tin diester and triazole composition described below.

My invention is operable on any conventional insulating composition including uncrosslinked or, preferably cross-linked polyethylene, polyethylene copolymers, or ethylene-propylene co- and terpolymers as the chief constituent, i.e. at least fifty percent by weight of the overall composition.

My invention includes a three-part composition which renders such conventional insulating materials freely strippable, comprising (1) a dialkyl tin diester, (2) a waxy amide, (3) a 3-amido-1,2,4-triazole of the formula

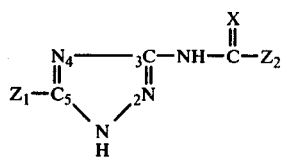

wherein:
a. $Z_1$ is selected from the group consisting of hydrogen, alkyl having from one to 18 carbon atoms; alkylenealkoxy and alkylenearyloxy having from two to 18 carbon atoms; phenyl; pyridyl;

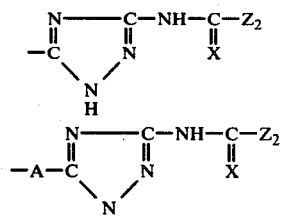

in which A is alkylene having from one to eight carbon atoms or vinylene;
b. X is selected from the group consisting of oxygen and sulfur;
c. $Z_2$ is a benzene or naphthalene ring substituted by from one to two $R_1$ groups and from zero to two $R_2$ groups;
  i. $R_1$ is selected from the group consisting of OH, SH and $SC_2H_4COOCH_3$; and
  ii. $R_2$ is selected from the group consisting of alkyl, alkyl phenyl, alkoxy and alkyl phenoxy, each having from one to 18 carbon atoms; phenyl, phenoxy and halogen; and

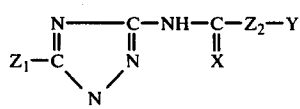

where Y is selected from the group consisting of oxygen; sulfur;

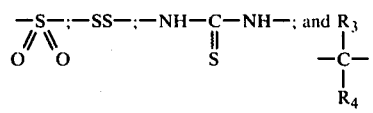

$R_3$ and $R_4$ are selected from the group consisting of hydrogen and alkyl having from one to three carbon atoms, provided, that there are at most two 1,2,4-triazole groups in the molecule.

The preferred waxy amide is N, N' ethylene bis-stearamide.

The preferred dialkyl tin ester is dibutyl tin dilaurate. The alkyl groups may range from three to six carbon atoms; the ester groups are generally larger.

The triazoles are described in U.S. Pat. No. 3,997,551.

The three-part composition may be used in the conventional insulating material in amounts from about 1% to about 5% of the overall composition.

In the following demonstrations of my invention, a composition comprising the first seven ingredients from Table I was made in the proportions shown; to it was added the various additional ingredients shown in Table II in the weight percentages indicated, and the compositions were tested for sticking after being formed as insulation made on copper wire. Compositions C, D, E, L, M, N, O, S and W did not stick, while the rest did.

The ingredients are as follows:
1. a sulfur-containing organo-tin stabilizer.
2. dibutyl tin dilaurate heat stabilized with BHT.
3. N,N' ethylene bis-stearamide.
4. a triazole of the formula

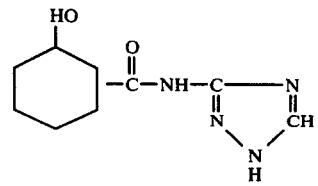

(Mark 1475)

5. a liquid organo-tin stabilizer without antioxidant.
6. dicumyl peroxide.
7. 2,5-bis(tert-butyl peroxy)-2,5-dimethyl hexane dispersion.
8. triallyl cyanurate.

TABLE II

| | INGREDIENTS (percent by weight) | | | | | | | |
|---|---|---|---|---|---|---|---|---|
| | 1 | 2 | 3 | 4 | 5 | 6 | 7 | 8 |
| A | 0.125 | — | — | — | — | 4.0 | 1.0 | 0.2 |
| B | 0.125 | 0.125 | — | — | — | 4.0 | 1.0 | 0.2 |
| C | — | 0.125 | 0.5 | 0.5 | — | 4.0 | 1.0 | 0.2 |
| D | — | 0.125 | 0.5 | 0.5 | 0.125 | 4.0 | 1.0 | 0.2 |
| E | — | — | 0.5 | 0.5 | 0.125 | 4.0 | 1.0 | 0.2 |
| F | — | 0.125 | 0.5 | 0.25 | 0.125 | 4.0 | 1.0 | 0.2 |
| G | — | 0.125 | — | — | 0.125 | 4.0 | 1.0 | 0.2 |
| H | — | 0.125 | 0.5 | — | 0.125 | 4.0 | 1.0 | 0.2 |
| I | — | 0.125 | 0.25 | 0.25 | — | 4.0 | 1.0 | 0.2 |
| J | — | — | — | — | 0.25 | 4.0 | 1.0 | 0.2 |
| K | — | — | 0.25 | 0.25 | 0.125 | 4.0 | 1.0 | 0.2 |
| L | — | 0.25 | 1 | 1 | — | 2.5 | 1.5 | — |
| M | — | 0.25 | 0.5 | 0.5 | — | 2.5 | 1.5 | — |
| N | — | 0.25 | 0.5 | 0.5 | — | 2.5 | 1 | — |
| O | — | 0.25 | 1 | 1 | — | 2.5 | 1 | — |
| P | — | — | — | — | — | 3.0 | — | — |
| Q | — | — | — | — | — | 3.0 | — | 0.2 |
| R | — | — | — | — | — | 3.5 | — | 0.2 |
| S | — | 0.25 | 1.0 | 0.5 | — | 3.25 | 1.33 | 0.2 |
| T | — | — | 1.0 | 0.5 | 0.25 | 3.25 | 1.33 | 0.2 |
| U | — | 0.25 | 1.0 | 0.25 | — | 3.25 | 1.33 | 0.2 |
| V | — | — | 1.0 | 0.25 | 0.25 | 3.25 | 1.33 | 0.2 |
| W | — | 0.25 | 0.5 | 0.5 | — | 3.25 | 1.33 | 0.2 |
| X | — | — | 0.5 | 0.5 | 0.25 | 3.25 | 1.33 | 0.2 |
| Y | — | 0.25 | 0.5 | 0.5 | — | 3.25 | 1.33 | 0.2 |
| Z | — | — | 0.5 | 0.25 | 0.25 | 3.25 | 1.33 | 0.2 |

Thus, it may be seen that my invention includes compositions and methods for making cable and insulated copper conductor which are freely strippable. I do not intend to be limited to the above specific compositions and methods. The invention may otherwise be practiced within the scope of the following claims.

I claim:

1. Composition useful in freely strippable insulation for cables and the like comprising
   (1) N,N' ethylene bis-stearamide,
   (2) a dialkyl tin diester,
   (3) a 3-amido-1,2,4-triazole of the formula

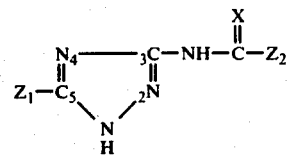

wherein:
   a. $Z_1$ is selected from the group consisting of hydrogen, alkyl having from one to 18 carbon atoms; alkylenealkoxy and alkylenearyloxy having from two to 18 carbon atoms; phenyl; pyridyl;

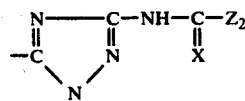

and

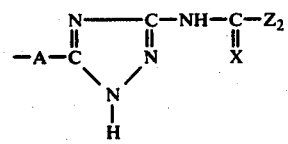

in which A is alkylene having from one to eight carbon atoms or vinylene;
   b. X is selected from the group consisting of oxygen and sulfur;
   c. $Z_2$ is a benzene or naphthalene ring substituted by from one to two $R_1$ groups and from zero to two $R_2$ groups;
      i. $R_1$ is selected from the group consisting of OH, SH and $SC_2H_4COOCH_3$; and
      ii. $R_2$ is selected from the group consisting of alkyl, alkyl phenyl, alkoxy and alkyl phenoxy, each having from one to 18 carbon atoms; phenyl, phenoxy and halogen;
   in ratios by weight of (1):(2):(3) of about 5–20:0.5–2:5–20.

2. Composition of claim 1 in which the triazole is

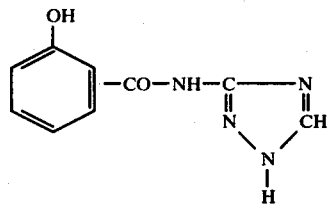

3. Composition of claim 1 in which the dialkyl tin ester is dibutyl tin dilaurate.

4. Composition of claim 1 in which the ingredients (1), (2), and (3) are present in weight ratios of about 10:1:10.

5. Method of rendering a polymeric insulation freely strippable from a copper conductor comprising adding thereto, prior to forming an insulating layer on the copper conductor, about 1% to about 5%, based on the weight of the insulating composition, of the composition of claim 1.

6. A vulcanizable insulating composition comprising a major amount of olefin polymer, a small amount of vulcanizing agent, and a small amount of the composition of claim 1.

7. A vulcanizable insulating composition for cables and the like which is freely strippable from copper conductor comprising, in parts by weight, about 100 parts olefinic polymer, up to about 110 parts filler, about two to about twenty parts cross-linking agent, and the composition of claim 1 in an amount about 1% to 5% by weight of the overall composition.

8. A cable comprising a copper conductor and an insulation layer around it comprising a vulcanized polyolefin including a small amount of the composition of claim 1.

9. A cable including a copper conductor having an insulation layer comprising a vulcanized polyolefin and a small amount of the composition of claim 4.

UNITED STATES PATENT AND TRADEMARK OFFICE
CERTIFICATE OF CORRECTION

PATENT NO. : 4,140,818
DATED : February 20, 1979
INVENTOR(S) : Bharat Dave'

It is certified that error appears in the above-identified patent and that said Letters Patent are hereby corrected as shown below:

Column 2, line 39, "helpful" should be -- useful --.

Column 4, line 63, change the entry for Ingredient #4, Composition Y, from "0.5" to -- 0.25 --.

Signed and Sealed this

Fifteenth Day of May 1979

[SEAL]

Attest:

RUTH C. MASON
Attesting Officer

DONALD W. BANNER
Commissioner of Patents and Trademarks